United States Patent
Lightner et al.

(10) Patent No.: US 9,201,931 B2
(45) Date of Patent: Dec. 1, 2015

(54) METHOD FOR OBTAINING SEARCH SUGGESTIONS FROM FUZZY SCORE MATCHING AND POPULATION FREQUENCIES

(71) Applicant: QBASE, LLC, Reston, VA (US)

(72) Inventors: Scott Lightner, Leesburg, VA (US);
Franz Weckesser, Spring Valley, OH (US); Rakesh Dave, Dayton, OH (US);
Sanjay Boddhu, Dayton, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/558,202

(22) Filed: Dec. 2, 2014

(65) Prior Publication Data

US 2015/0154197 A1 Jun. 4, 2015

Related U.S. Application Data

(60) Provisional application No. 61/910,907, filed on Dec. 2, 2013.

(51) Int. Cl.
*G06F 17/30* (2006.01)
*G06N 5/00* (2006.01)

(52) U.S. Cl.
CPC ........ *G06F 17/3053* (2013.01); *G06F 17/3064* (2013.01); *G06F 17/30542* (2013.01); *G06F 17/30616* (2013.01); *G06F 17/30646* (2013.01); *G06N 5/00* (2013.01)

(58) Field of Classification Search
CPC .......... G06F 17/3064; G06F 17/30542; G06F 17/30646; G06F 17/30616; G06F 17/3053; G06N 5/00; G06N 6/00
See application file for complete search history.

(56) References Cited

U.S. PATENT DOCUMENTS

| | | | |
|---|---|---|---|
| 6,006,225 A * | 12/1999 | Bowman et al. | |
| 8,732,101 B1 * | 5/2014 | Wilson et al. | 706/15 |
| 2003/0033288 A1 * | 2/2003 | Shanahan et al. | 707/3 |
| 2006/0129843 A1 | 6/2006 | Srinivasa et al. | |
| 2008/0027915 A1 | 1/2008 | Karasudani et al. | |
| 2008/0306908 A1 | 12/2008 | Agrawal et al. | |
| 2009/0163183 A1 * | 6/2009 | O'Donoghue et al. | 455/414.1 |

(Continued)

OTHER PUBLICATIONS

International Search Report dated Apr. 15, 2015 corresponding to International Patent Application No. PCT/US2014/067997, 4 pages.

(Continued)

*Primary Examiner* — Leslie Wong
(74) *Attorney, Agent, or Firm* — Eric L. Sophir; Dentons US LLP

(57) ABSTRACT

A method for obtaining and providing search suggestions using entity co-occurrence is disclosed. The method may be employed in any search system that may include at least one search engine, one or more databases including entity co-occurrence knowledge and trends co-occurrence knowledge. The method may extract and disambiguate entities from search queries by using an entity and trends co-occurrence knowledge in one or more database. Subsequently, a list of search suggestion may be provided by each database, then by comparing the score of each search suggestion, a new list of suggestion may be built based on the individual and/or overall score of each search suggestion. Based on the user's selection of the suggestions, the trends co-occurrence knowledgebase can be updated, providing a means of on-the-fly learning, which improves the search relevancy and accuracy.

2 Claims, 3 Drawing Sheets

(56) References Cited

U.S. PATENT DOCUMENTS

| | | |
|---|---|---|
| 2012/0143875 A1 | 6/2012 | Sarma et al. |
| 2013/0144605 A1 | 6/2013 | Brager et al. |
| 2013/0159506 A1* | 6/2013 | Stern et al. .................... 709/224 |
| 2013/0275164 A1* | 10/2013 | Gruber et al. ..................... 705/5 |
| 2013/0311485 A1 | 11/2013 | Khan |
| 2014/0207748 A1* | 7/2014 | Sood et al. .................... 707/706 |

OTHER PUBLICATIONS

Written Opinion of the International Searching Authority dated Apr. 15, 2015 corresponding to International Patent Application No. PCT/US2014/067997, 9 pages.

* cited by examiner

METHOD FOR OBTAINING SEARCH SUGGESTIONS FROM FUZZY SCORE MATCHING AND POPULATION FREQUENCIES

CROSS-REFERENCE TO RELATED APPLICATIONS

This non-provisional application claims the benefit of U.S. Provisional Patent Application Ser. No. 61/910,907, entitled "Method For Obtaining Search Suggestions From Fuzzy Score Matching And Population Frequencies," filed Dec. 2, 2013, which is hereby incorporated by reference in its entirety.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/557,989, entitled "Method for Searching for Related Entities Through Entity Co-Occurrence," filed Dec. 2, 2014; and U.S. patent application Ser. No. 14/558,036, entitled "Search Suggestions Fuzzy-Score Matching and Entity Co-Occurrence," filed Dec. 2, 2014; and U.S. patent application Ser. No. 14/558,159, entitled "Search Suggestions Of Related Entities Based On Co-Occurrence And/Or Fuzzy-Score Matching," filed Dec. 2, 2014. Each of the above-referenced applications are hereby incorporated in their entirety.

TECHNICAL FIELD

The present disclosure relates generally to methods and systems for information retrieval, and more specifically to a method for obtaining search suggestions.

BACKGROUND

Search engines include a plurality of features in order to provide a forecast for user's query. Such forecast may include query auto-complete and search suggestions. Nowadays, such forecast methods are based on historic keywords references. Such historic references may not be accurate because one keyword could be referred to a plurality of topics in a single text.

In addition, user search queries may include one or more entities identified by name or attributes that may be associated with the entity. Entities may also include organizations, people, locations, events, date and/or time. In a typical search, if a user is searching for information related to two particular organizations, a search engine may return assorted results that may be about a mixture of different entities with the same name or similar names. The latter approach may lead the user to find a very large amount of documents that may not be relevant to what the user is actually interested.

Thus, a need exists for a method for obtaining quicker and more accurate search suggestions.

SUMMARY

A method for obtaining search suggestions related to entities using entity and feature co-occurrence is disclosed. In one aspect of the present disclosure, the method may be employed in a search system that may include a client/server type architecture.

A search system using a method which may employ entities stored in one or more servers, which may allow an entity database and a trends database. Entities on such databases may have a score for indexing based on the higher score. Method for obtaining search suggestions may combine information stored in both databases for generating a single list of search suggestions. Trends database may provide previous search queries from one or more users in a local network and/or the Internet. Entity database may provide search suggestions based on entities extraction from a plurality of data available in a local network and/or the Internet. This list may provide a more accurate and quicker group of suggestions for the user.

In one embodiment, a computer-implemented method comprises receiving, by a computer, from a search engine a search query comprising one or more strings of data, wherein each respective entity corresponds to a subset of the one or more strings; identifying, by the computer, one or more entities in the one or more strings of data based on comparing the one or more entities against an entity database and a trends database; identifying, by the computer, one or more features in the one or more strings of data not identified as corresponding to at least one entity; assigning, by the computer, each of the one or more features to at least one of the one or more entities based on a matching algorithm; assigning, by the computer, an extraction score to each respective entity based on a score assigned to each respective feature assigned to the respective entity; receiving, by the computer, from an entity database a first search list containing one or more entities having a score within a threshold distance from the extraction score of each respective entity; receiving, by the computer, from a trends database a second search list containing one or more entities having a score within a threshold distance from the extraction score of each respective entity; generating, by the computer, an aggregated list comprising the first search list and the second search list, wherein the entities of the aggregated list are ranked according to the score of each respective aggregated list; and providing, by the computer, a suggested search according to the aggregated list.

Numerous other aspects, features and benefits of the present disclosure may be made apparent from the following detailed description.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
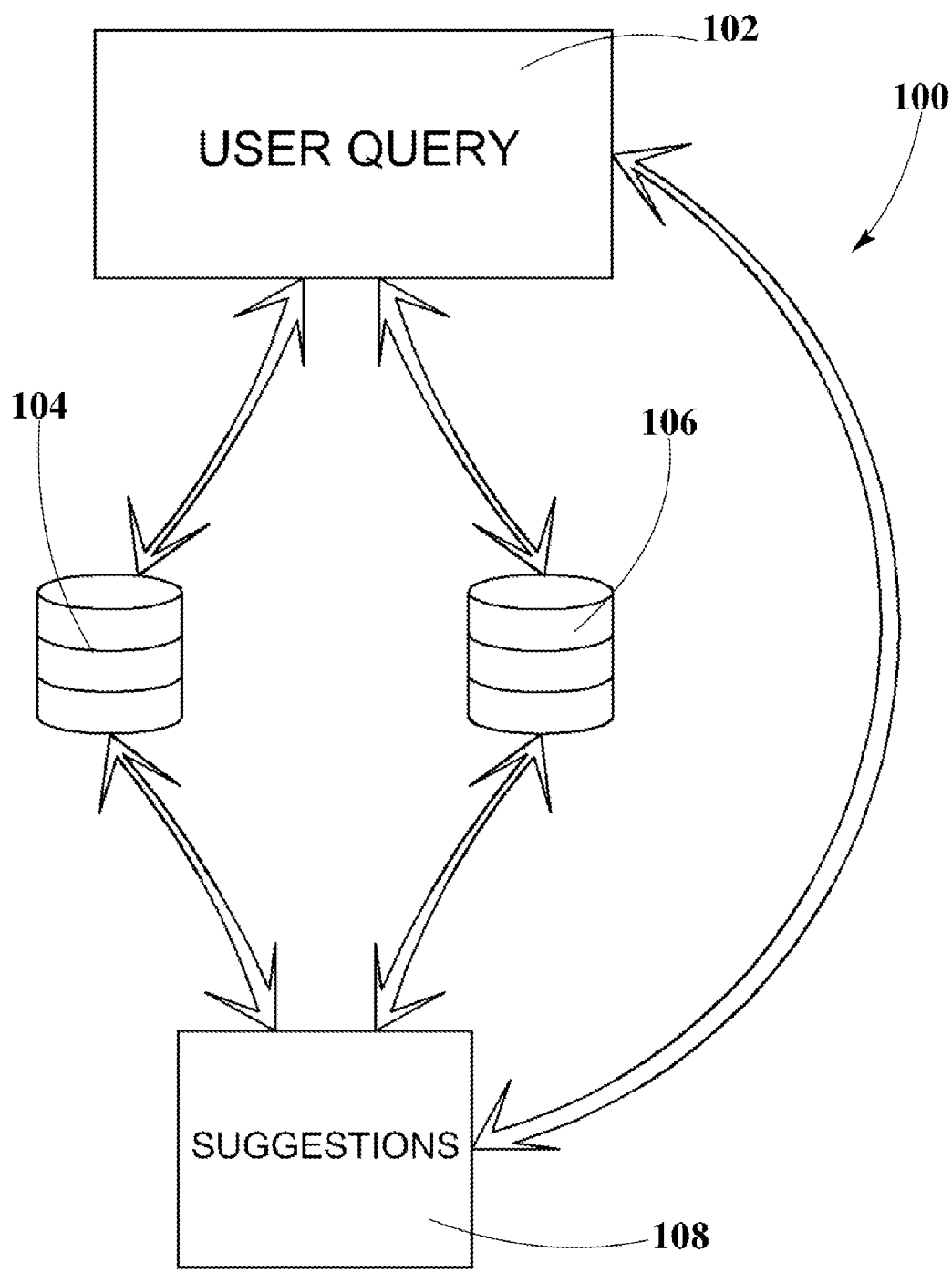
FIG. 1 is a block diagram illustrating a method for obtaining search suggestions based on entities and trends databases.

As used here, the following terms may have the following definitions:

"Entity extraction" refers to information processing methods for extracting information such as names, places, and organizations.

"Corpus" refers to a collection of one or more documents

"Features" is any information which is at least partially derived from a document.

"Feature attribute" refers to metadata associated with a feature; for example, location of a feature in a document, confidence score, among others.

"Module" refers to a computer or software components suitable for carrying out at least one or more tasks.

"Fact" refers to objective relationships between features.

"Entity knowledge base" refers to a base containing features/entities.

"Query" refers to a request to retrieve information from one or more suitable databases.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

An in-memory database is a database storing data in records controlled by a database management system (DBMS) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

Described herein are systems and methods providing a search suggestion generation mechanism, which may be used in a distributed computing system, among other applications. Embodiments may implement techniques for mining and ranking activities related to the system's history of search queries, and particularly those provided from users. The system may employ a various knowledge bases storing historical data, such as an entity co-occurrence knowledge base and a trends co-occurrence knowledge base. The presented search suggestions mechanism, besides the aforementioned knowledge bases, includes fuzzy matching modules and entity extraction modules.

A entity co-occurrence knowledge base may be a static and/or less-frequently updated repository in which database records of entities may be indexed according to relationships associated with the entities those records have with other data of the system. These entity records may contain information related to various types of relationships, such as entities to entities, entities to topics, and/or entities to facts, among others. Indices may use information such as relationship data to store and reference records to allow faster responses to search queries. In some cases, the information may be used to provided "weighted" responses to help identify the most critical responses to search queries. Additionally or alternatively, a trends co-occurrence knowledge base may be functionally and structurally similar to entity co-occurrence knowledge base, but may store information in records related to more dynamic, trending entities from a real-world perspective.

While in operation, the user partial/complete queries are processed on-the-fly to detect entities (entity extraction), misspelled variations (fuzzy matching) of the entities, and other conceptual features of the identified entities. These features are employed to search (fuzzy score matching) an entity co-occurrence knowledge base and a trends co-occurrence knowledge base, to generate suggested search queries. Further, the entity and trend knowledge bases may be configured to respond with an aggregated list of suggested searches (combining both the entity and trend knowledge bases), or two individual list of suggestions labeling the sources (entity or trends) to the user. Additionally, once the suggested query (i.e., entity) is chosen by the user, the system would update the trend knowledge base, with the features extracted from the user's query and the selected suggestions, providing a means of on-the-fly learning, which improves consecutive search relevancy and accuracy of the system. Further, trends co-occurrence knowledge base can be populated by the different users using the system and also by automatic methods like trend detection modules.

FIG. 1 is a block diagram of a search system 100 in accordance with the present disclosure. The search system 100 may include a search engine 102, such search engine 102 may include one or more user interfaces allowing data input from the user, such as user queries.

Search system 100 may include one or more databases. Such databases may include entity database 104 and trends database 106. Databases may be stored in a local server or in a web based server. Thus, search system 100 may be implemented in a client/server type architecture; however, the search system 100 may be implemented using other computer architectures, for example, a stand-alone computer, a mainframe system with terminals, an ASP model, a peer to peer model, and the like, and a plurality of networks such as, a local area network, a wide area network, the internet, a wireless network, a mobile phone network, and the like.

A search engine 102 may include, but is not limited to, a web-based tool that enables users to locate information on the World Wide Web. Search engine 102 may also include tools that enable users to locate information within internal database systems.

Entity database 104, which may be implemented as a single server or in a distributed architecture across a plurality of servers. Entity database 104 may allow a set of entities queries, such as a query string, structured data and the like. Such set of entities queries may be previously extracted from a plurality of corpus available in the internet and/or local network. Entities queries may be indexed and scored. Example of entities may include people, organizations, geographic locations, dates and/or time. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

Trends database 106, which may be implemented as a single server or in a distributed architecture across a plurality of servers. Trends database 106 may allow a set of entities queries, such as a query string, structured data, and the like. Such set of entities queries may be previously extracted from historical queries performed by the user and/or a plurality of users in the internet and/or local network. Entities queries may be indexed and scored. Example of entities may include people, organizations, geographic locations, dates and/or time. During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

Entity database 104 and trends database 106 may include entity co-occurrence knowledge base, which may be built, but is not limited to, as an in-memory database (not shown) and may include other components (not shown), such as one or more search controllers, multiple search nodes, collections of compressed data, and a disambiguation module. One search controller may be selectively associated with one or more search nodes. Each search node may be capable of independently performing a fuzzy key search through a collection of compressed data and returning a set of scored results to its associated search controller.

Co-occurrence knowledge base may include related entities based on features and ranked by a confidence score. Various methods for linking the features may be employed, which may essentially use a weighted model for determining which entity types are most important, which have more weight, and, based on confidence scores, determine how confident the extraction of the correct features has been performed.

Search system 100 may compare user query at search engine 102 against entity database 104 and trends database 106. Auto-complete mode on search engine 102 may be enabled from both databases; entity databases 104 and trends databases 106. Search system 100 may deploy a list of search suggestions 108 to the user, such list may be generated and indexed based on a fuzzy score assigned to each entity suggestion in databases. Score of each entity suggestion may be assigned automatically by the search system 100 and/or manually by a system supervisor. Entities suggestion may be ordered from the most relevant to the less relevant based on the score achieved by each entity. In addition, score in trends database 106 may be assigned using trends and query frequency from one or more users in a local network and/or Internet.

Entity suggestion of each database may be compared among them and then indexed and ordered by the rank obtained in the score, thus a list of search suggestions 108 may be shown to user combining entity suggestions in both databases; entity database 104 and trends database 106. If user select a suggestion from the list or select another result out of the suggestion list, then search system 100 may save such information in trends database 106. Thus, a self-learning system may be allowed, which may increase search system 100 reliability and accuracy. In brief, the trends co-occurrence knowledge base can be continuously updated, with the features extracted from the user's query and the selected suggestions, providing a means of on-the-fly learning, which improves the search relevancy and accuracy. Further, trends co-occurrence knowledge base can be populated by the different users using the system and also by automatic methods like trend detection modules.

Figure 2:
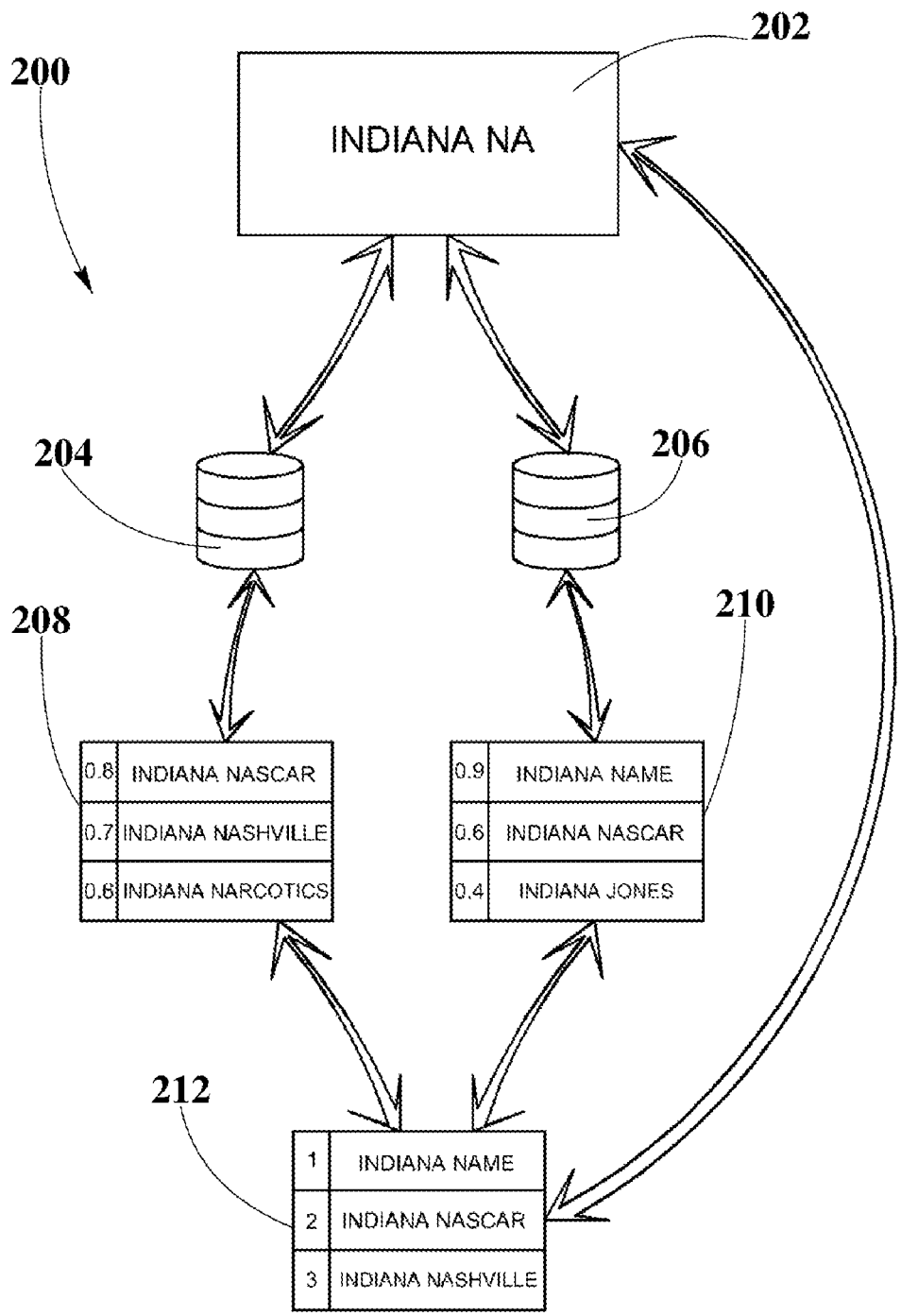
FIG. 2 is a block diagram illustrating a method for obtaining search suggestions based on entities and trends databases, by generating a list of suggestions based on an individual score of search suggestions in each databases.

FIG. 2 is a block diagram of a search system 200 in accordance with the present disclosure. The search system 200 may include a search engine 202, such search engine 202 may include one or more user interfaces allowing data input from the user, such as user queries.

Search system 200 may include one or more databases. Such databases may include entity database 204 and trends database 206. Databases may be stored in a local server or in a web based server. Thus, search system 200 may be implemented in a client/server type architecture; however, the search system 200 may be implemented using other computer architectures, for example, a stand-alone computer, a mainframe system with terminals, an ASP model, a peer to peer model, and the like, and a plurality of networks such as, a local area network, a wide area network, the internet, a wireless network, a mobile phone network, and the like.

In one embodiment, search system 200 may start when a user inputs one or more entities (in search queries) through a user interface in search engine 202. An example of a search query may be a combination of keywords in a string data format, structured data, and the like. These keywords may be entities that represent people, organizations, geographic locations, dates and/or time. In the present embodiment, "Indiana Na" is used as search query.

"Indiana Na" may then be processed for entity extraction. An entity extraction module may process search queries such as, "Indiana Na" as entities and compare them all against entity co-occurrence knowledge base in entity database 204 and trends database 206 to extract and disambiguate as many entities as possible. Additionally, the query text parts that are not detected as entities (e.g., person, organization, location), are treated as conceptual features (e.g., topics, facts, key phrases) that can be employed for searching the entity co-occurrence knowledge bases (e.g., entity and trend databases). During the extraction, one or more feature recognition and extraction algorithms may be employed. Also, a score may be assigned to each extracted feature, indicating the level of certainty of the feature being correctly extracted with the correct attributes. Taking into account the feature attributes, the relative weight or relevance of each of the features may be determined. Additionally, the relevance of the association between features may be determined using a weighted scoring model.

In the present embodiment, entity database 204 may show a list of search suggestions, as a list of entity suggestions 208, which may be indexed and ranked. Trends database 206 may show a list of search suggestions, as trends based suggestion list 210, which may be indexed and ranked. Subsequently, search system 200 may build a search suggestions list 212 based on those provided by entity database 204 and trends database 206. The search suggestions list 212 may be indexed and ranked based on the individual score of each entity suggestion in each database; thus, the most relevant may be shown first and the less relevant result may continue below it.

In search system 200, an exemplary use for obtaining search suggestion is disclosed. Search suggestions list 212 may show suggestions based on "Indiana Na" user query. As a result, "Indiana Name" may appear first based on an individual score of 0.9 for that entity, then "Indiana Nascar" may be shown as a result of an individual score of 0.8, finally "Indiana Nashville" may be shown based on an individual score of 0.7. The individual score may be compared using list of entity suggestions 208 and trends based suggestion list 210, without applying considering repeated entities.

Figure 3:
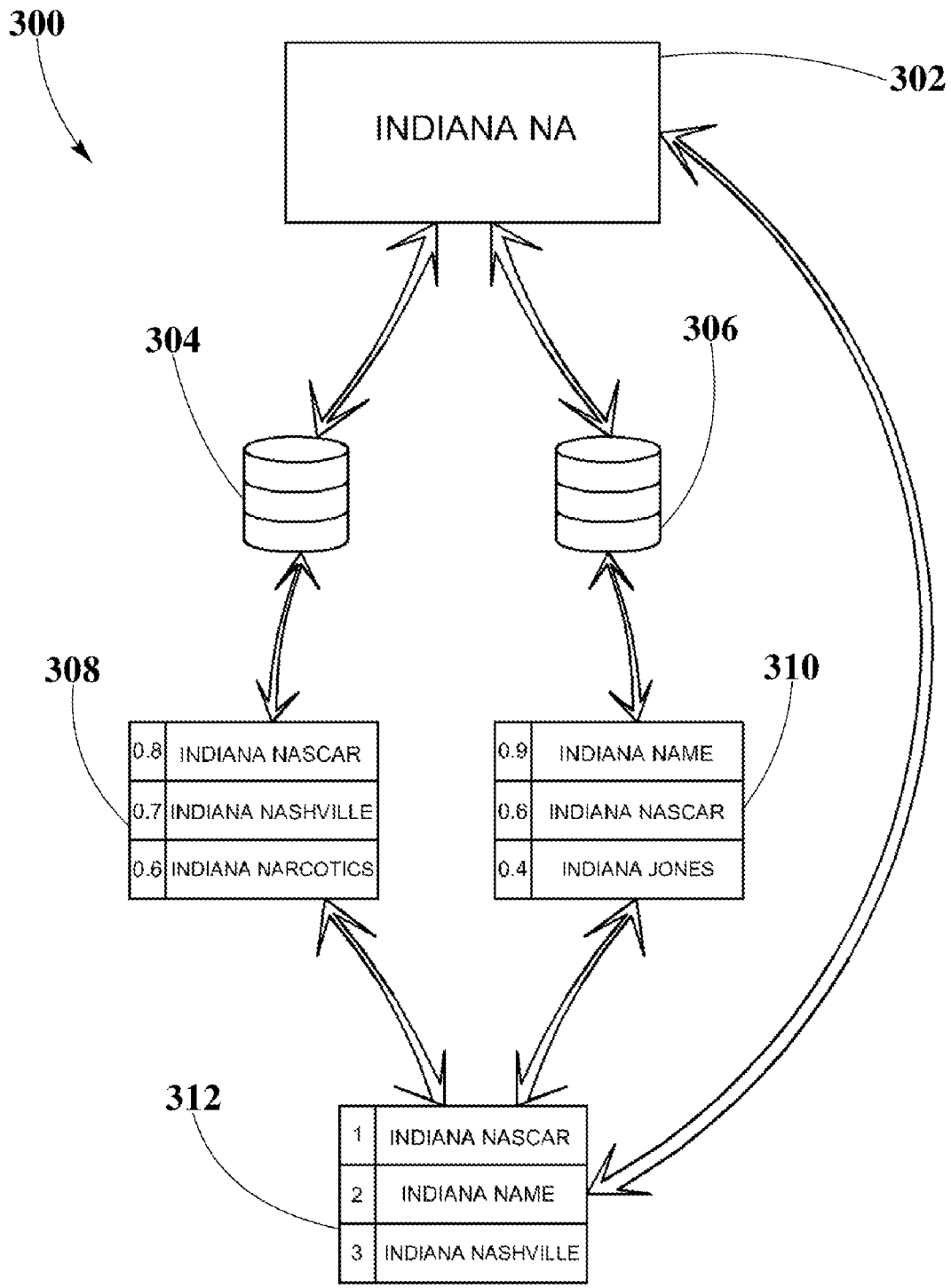
FIG. 3 is a block diagram illustrating a method for obtaining search suggestions based on entities and trends databases, by generating a list of suggestions based on an overall score of search suggestions on both databases.

FIG. 3 is a block diagram of a search system 300 in accordance with the present disclosure. Search system 300 may include a search engine 302, such search engine 302 may include one or more user interfaces allowing data input from the user, such as user queries.

Search system 300 may include one or more databases. Such databases may include entity database 304 and trends database 306. Databases may be stored in a local server or in a web based server. Thus, search system 300 may be implemented in a client/server type architecture; however, the search system 300 may be implemented using other computer architectures; for example, a stand-alone computer, a mainframe system with terminals, an ASP model, a peer to peer model, and the like, and a plurality of networks such as, a local area network, a wide area network, the internet, a wireless network, a mobile phone network, and the like.

In one embodiment, search system 300 may start when a user inputs one or more entities (search queries) through a user interface in search engine 302. An example of a search query may be a combination of keywords such as a string, structured data and the like. These keywords may be entities that represent people, organizations, geographic locations, dates and/or time. In the present embodiment, "Indiana Na" is used as search query.

"Indiana Na" may then be processed for entity extraction. An entity extraction module may process search queries such as, "Indiana Na," as entities and compare them all against entity co-occurrence knowledge base in entity database 304 and trends database 306 to extract and disambiguate as many entities as possible. Additionally, the query text parts that are not detected as entities (e.g., person, organization, location), are treated as conceptual features (e.g., topics, facts, key phrases), which may be employed for searching the entity co-occurrence knowledge bases (e.g., entity database, trend databases). During the extraction, one or more feature recognition and extraction algorithms may be employed. Also, a score may be assigned to each extracted feature, indicating the level of certainty of the feature being correctly extracted with the correct attributes. Based on the respective feature attributes, the relative weight and/or the relevance of each of the features, may be determined. Additionally, the relevance of the association between features may be determined using a weighted scoring model.

In the present embodiment, entity database 304 may show a list of search suggestions, list of entity suggestions 308, which may be already indexed and ranked. Equally, trends database 306 may show a list of search suggestions, trends based suggestion list 310, which may be already indexed and ranked. Subsequently, search system 300 may build a search suggestions list 312 based on those provided by entity database 304 and trends database 306. The search suggestions list 312 may be indexed and ranked based on the overall score of each entity suggestion in both databases, thus, the most relevant may be shown first and the less relevant result may continue below it.

In Search system 300, an exemplary use for obtaining search suggestion is disclosed. Search suggestions list 312 may show suggestions based on "Indiana Na" user query. As a result, "Indiana Nascar" may appear first based on an overall score of 1.4 resulting from the sum of score 0.8 at list of entity suggestions 308 and score 0.6 at trends based suggestion list 310. Similarly, "Indiana Name" may be shown as a result of an overall score of 0.9, finally "Indiana Nashville" may be shown based on an overall score of 0.7.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:

receiving, by a computer, from a search engine, a search query comprising one or more strings of data;

identifying, by the computer, one or more entities in the one or more strings of data based on comparing the one or more entities against a set of records stored in an entity database and a trends database;

identifying, by the computer, one or more features in the one or more strings of data not identified as corresponding to at least one entity;

assigning, by the computer, each of the one or more features to at least one of the one or more entities based on a matching algorithm;

assigning, by the computer, an extraction score to each respective entity based on a score assigned to each respective feature assigned to the respective entity;

receiving, by the computer, from the entity database, a first search list containing one or more entities having a score within a threshold distance from the extraction score of each respective entity;

receiving, by the computer, from the trends database, a second search list containing one or more entities having a score within a threshold distance from the extraction score of each respective entity;

generating, by the computer, an aggregated list comprising the first search list and the second search list, wherein the entities of the aggregated list are ranked according to the score of each respective aggregated list; and providing, by the computer, a suggested search according to the aggregated list.

2. The computer-implemented method of claim 1, wherein at least one of the entity database or the trends database is an in-memory database.

* * * * *